(12) United States Patent
Hinckley et al.

(10) Patent No.: US 7,061,474 B2
(45) Date of Patent: Jun. 13, 2006

(54) AUTOMATIC SCROLLING

(75) Inventors: Kenneth P. Hinckley, Redmond, WA (US); Steven N. Bathiche, Redmond, WA (US); James H. Cauthorn, Seattle, WA (US); Michael J. Sinclair, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/754,603

(22) Filed: Jan. 12, 2004

(65) Prior Publication Data

US 2004/0140984 A1  Jul. 22, 2004

Related U.S. Application Data

(62) Division of application No. 09/940,463, filed on Aug. 29, 2001, now Pat. No. 6,690,365.

(51) Int. Cl.
*G09G 5/00* (2006.01)
(52) U.S. Cl. ............... 345/173; 345/684; 715/785; 715/786; 715/973
(58) Field of Classification Search ........ 345/156–169, 345/173–183, 684–688; 178/18.01, 18.02, 178/18.03, 18.04, 18.05, 18.06, 18.07, 18.08, 178/18.09, 18.11; 715/784–786, 973
See application file for complete search history.

(56) References Cited

U.S. PATENT DOCUMENTS

| 5,371,846 | A | 12/1994 | Bates |
| 5,506,951 | A | 4/1996 | Ishikawa |
| 5,532,754 | A | 7/1996 | Young et al. |
| 5,748,185 | A | 5/1998 | Stephan et al. |
| 5,771,037 | A | 6/1998 | Jackson |
| 5,864,330 | A | 1/1999 | Haynes |
| 5,889,236 | A | 3/1999 | Gillespie et al. |
| 5,943,044 | A | 8/1999 | Martinelli et al. |
| 5,943,052 | A | 8/1999 | Allen et al. |
| 5,952,942 | A | 9/1999 | Balakrishnan et al. |
| 6,016,110 | A | 1/2000 | Takinami |
| 6,034,668 | A | 3/2000 | Jackson |
| 6,043,809 | A | * | 3/2000 | Holehan .................. 345/168 |
| 6,075,522 | A | 6/2000 | Milroy |
| 6,084,570 | A | 7/2000 | Milroy |
| 6,147,683 | A | 11/2000 | Martinez et al. |
| 6,157,381 | A | 12/2000 | Bates et al. |
| 6,369,837 | B1 | 4/2002 | Schirmer |
| 6,657,615 | B1* | 12/2003 | Harada .................. 345/173 |

FOREIGN PATENT DOCUMENTS

JP  06-202800  *  7/1994
JP  08-146044  *  6/1996

(Continued)

OTHER PUBLICATIONS

William Buxton et al., "A Study in Two-Handed Input", Proceedings of CHI '86, 1986, pp. 321-326.

(Continued)

*Primary Examiner*—Lun-yi Lao
(74) *Attorney, Agent, or Firm*—Banner & Witcoff, Ltd.

(57) ABSTRACT

A scrolling device for a computer may include a touch-sensitive surface, which may be elongated and/or have one or more active regions. Scrolling may be performed in manual as well as automated ways that may result in more accurate and efficient scrolling. Scrolling, as displayed on the screen, may further be rounded to the nearest document text line and/or distance unit, even though a more precise scrolling location value may be stored and/or tracked.

11 Claims, 8 Drawing Sheets

FOREIGN PATENT DOCUMENTS

| JP | 10-312264 | * | 11/1998 |
| --- | --- | --- | --- |
| JP | 11-53165 | * | 2/1999 |
| JP | 2000-181617 | * | 6/2000 |
| JP | 2000-214994 | * | 8/2000 |
| JP | 2000-292194 | * | 10/2000 |

OTHER PUBLICATIONS

Yves Guiard, "Asymmetric Division of Labor in Human Skilled Bimanual Action: The Kinematic Chain as a Model", Journal of Motor Behavior, vol. 19, No. 4, 1987, pp. 486-517.

Shumin Zhai, et al., "Improving Browsing Performance: A Study of Four Input Devices for Scrolling and Pointing Tasks", Proceedings of INTERACT97: The Sixth IFIP Conference on Human-Computer Interaction, pp. 286-292.

Ken Hinckley, et al., "Interaction and Modeling Techniques for Desktop Two-Handed Input", Proceedings of ACM UIST'98 Symposium on User Interface Software and Technology, 1998, pp. 49-58.

William Buxton, et al., "Issues and Techniques in Touch-Sensitive Tablet Input", Computer Graphics, Proceedings of SIGGRAPH'85, 19(3), 1985, pp. 215-223.

Takeo Igarashi, et al., "Speed-dependent Automatic Zooming for Browsing Large Documents", (Dated prior to Aug. 29, 2001).

Stephen A. Brewster et al., "The Design and Evaluation of an Auditory-Enhanced Scrollbar", Human Factors in Computing Systems, 1994, pp. 173-179.

William Buxton, "There's More to Interaction than Meets the Eye: Some Issues in Manual Input", User Centered System Design: New Perspectives on Human-Computer Interaction, 1986, pp. 319-337.

William Buxton., "Two-Handed Document Navigation", XEROX Disclosure Journal, 19(2), 1994, pp. 103-108.

Brad A. Myers, et al., "Two-Handed Input Using a PDA and a Mouse", Human Computer Interaction Institute, School of Computer Science, Carnegie Mellon University, (Dated prior to Aug. 29, 2001).

Overview of Synaptics Touch Pad Features (6 pages), (Dated prior to Aug. 29, 2001).

Scott Mackenzie, "(How) To Scroll or (How) Not To Scroll", University of Guelph, (Dated prior to Aug. 29, 2001).

Synaptics webpage, http://www.synaptics.com/supp-touchdrivers.cfm, printed Dec. 13, 2000, (3 Pages).

Synaptics webpage, http://www.synaptics.com/supp-driver-theramin.cfm, printed Dec. 13, 2000, (3 Pages).

* cited by examiner

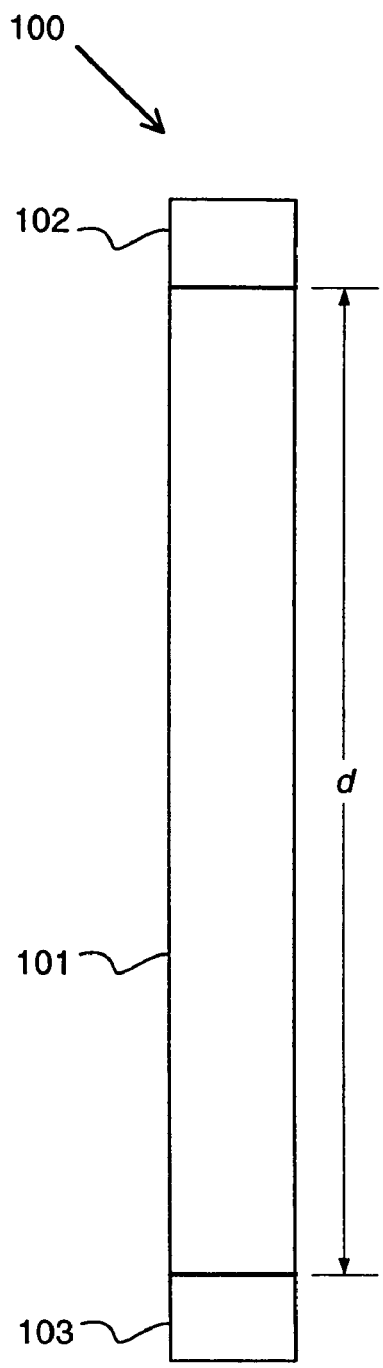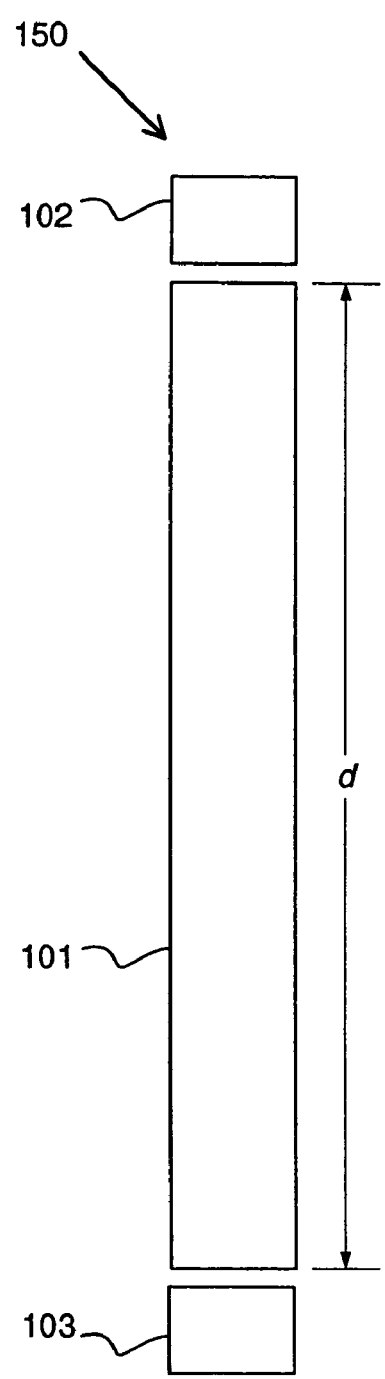
FIG. 1A  FIG. 1B

AUTOMATIC SCROLLING

CROSS-REFERENCE TO RELATED APPLICATIONS

This application claims priority to and is a divisional of U.S. patent application Ser. No. 09/940,463, entitled "Automatic Scrolling," filed Aug. 29, 2001 now U.S. Pat. No. 6,690,365, hereby incorporated by reference as to its entirety. This application is also related to U.S. patent application Ser. No. 09/940,900, entitled "Touch Sensitive Device for Scrolling a Document on a Display," and U.S. patent application Ser. No. 09/940,505, entitled "Manual Controlled Scrolling," both filed Aug. 29, 2001, hereby incorporated by reference as to their entireties.

FIELD OF THE INVENTION

The present invention is directed generally to the scrolling of a document on a display screen or the like, and more particularly to various apparatuses and methods for controlling document scrolling using a touch-sensitive scrolling device.

BACKGROUND OF THE INVENTION

Scrolling of documents, such as word processing documents or Internet web pages, for example, is a common task when using computing systems. There have been recent efforts focusing on methods and techniques for providing pleasant and efficient user interfaces for scrolling. It has been observed that people perform many real-world tasks using both hands. When users operate computers, however, they are often required to use a single hand for many major interface activities, such as moving a mouse. The single hand used is usually the dominant hand of the user. Even when using the mouse to scroll through a document, the dominant hand is typically used. This can be inefficient where the dominant hand may be required for other tasks as well, such as entering numbers on a numeric pad or selecting objects on the screen.

Known methods of scrolling documents are also not as intuitive or easy to use as they could be. For instance, conventional systems typically require that the user first move a cursor on the screen to a scroll bar before scrolling with a mouse, or that the user press arrow keys on a keyboard or rotate a scroll wheel on a mouse. However, some of these techniques do not allow for precise scrolling or the ability to move to a distant portion of the document quickly and accurately. There is a need for better ways to accurately control document scrolling. There is also a need for providing the ability to accurately control document scrolling without the user having to move his or her hands from the keyboard.

SUMMARY OF THE INVENTION

According to one aspect of the present invention, a touch-sensitive scrolling device, preferably in the form of an elongated touch-sensitive strip-shaped surface, may be used to manually control scrolling. The scrolling device may, however, be of various shapes, such as square, rectangular, oblong, circular, cross-shaped, X-shaped, and oval.

Various automatic scrolling functions may be implemented using the scrolling device. According to an aspect of the present invention, various techniques and/or gestures may be used to initiate an auto-scroll mode and/or other mode. These techniques are related to regional positioning of the user's finger (or other pointer) for a threshold amount of time and/or with at least a threshold amount of pressure. In a hold-and-scroll initiation technique, the speed of the automatic scrolling may be determined by finger pressure and/or other factors. For instance, if the user initiates contact with the scrolling device within an up-scrolling or down-scrolling region, then the document may in response begin to auto-scroll following an optional short delay. The rate of automatic scrolling may depend upon the amount of finger/pointer pressure applied to the surface of the scrolling device. To more accurately calculate the amount of finger pressure applied, a specialized algorithm may be used.

According to another aspect of the present invention, if the user touches and holds the pointer anywhere on the touch-sensitive surface of the scrolling device without moving or without substantial movement, then after an optional short delay an auto-scrolling mode may be initiated such that subsequent motions of the pointer along the scrolling device surface causes to the document to scroll at a rate related to the distance between the initial contact point and the current position of the user's pointer.

According to yet another aspect of the present invention, different scrolling rates and/or sensitivities may be utilized for scrolling in one direction (e.g., scrolling up) as compared with scrolling in another direction (e.g., scrolling down). This may help account for the shape of the touch-sensitive surface of the scrolling device and/or bezel and/or for the fact that more of the user's finger/pointer may be expected to contact the surface of the scrolling device in one area of the surface as compared with another area of the surface, due to the position of the hand and/or shape of the finger/pointer.

These and other features of the invention will be apparent upon consideration of the following detailed description of preferred embodiments. Although the invention has been defined using the appended claims, these claims are exemplary in that the invention is intended to include the elements and steps described herein in any combination or subcombination. Accordingly, there are any number of alternative combinations for defining the invention, which incorporate one or more elements from the specification, including the description, claims, and drawings, in various combinations or subcombinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It is intended that the written description of the invention contained herein covers all such modifications and alterations.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention. In the accompanying drawings, elements are labeled with three-digit reference numbers, wherein the first digit of a reference number indicates the drawing number in which the element is first illustrated. The same reference number in different drawings refers to the same element.

FIGS. 1A and 1B are plan views of exemplary scrolling devices, in the form of a strip, according to at least one aspect of the present invention.

DETAILED DESCRIPTION OF EXEMPLARY EMBODIMENTS

Figure 2:
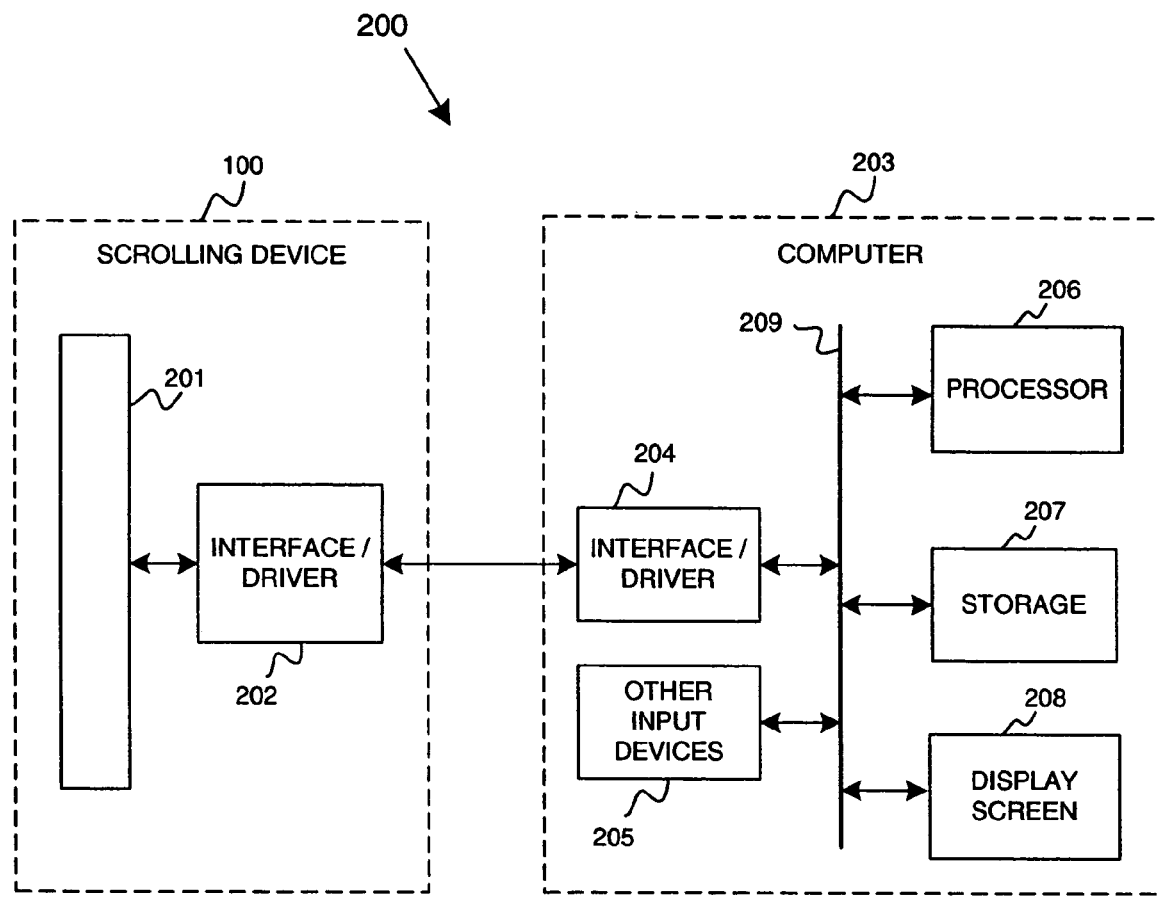
FIG. 2 is a functional block diagram of an exemplary system including a scrolling device, and computer, and interfaces between them, according to at least one aspect of the present invention.

Referring to FIGS. 1A and 1B, a touch-sensitive scrolling device 100 may be coupled to a computer 202 (FIG. 2) or another electronic processing system such that the position of a pointer (e.g., a human finger, a stylus, or other appropriate object) on the scrolling device 100 affects the scroll position of a document as shown on an output device such as a display screen 208 (FIG. 2). Throughout the specification, there will often be references to the user's finger. Such reference is merely exemplary and will be understood to apply to any type of pointer.

Touch-sensitive pads and devices are well-known, such as the touch pad for cursor control commonly found on many laptop computers. The present scrolling device 100 may take advantage of such known technology and/or be physically configured in any way to create a touch-sensitive device. The scrolling device 100 may be sensitive to human touch and/or to non-human touch such as from a pen or stylus-type pointer. The scrolling device 100 also may be utilized without actually touching the surface of the scrolling device 100 with the pointer. For instance, the scrolling device 100 may be configured to detect the pointer position as it hovers just over the surface of the scrolling device 100; such proximity-detection technology is also known. What is important is that the scrolling device 100 and/or other device, computer, or interface in combination with the scrolling device 100 be able to determine the position of the pointer relative to the surface of the scrolling device 100, either where the pointer is near to or touching the surface of the scrolling device 100.

The scrolling device 100 may or may not be physically and/or functionally subdivided. Where the scrolling device 100 is subdivided, the scrolling device 100 may have a scrolling region 101 and/or one or more active regions 102, 103. The active regions 102, 103 may be of any shape and/or size, and may be physically attached to or separate from the scrolling region 101 and/or each other. In another embodiment, the scrolling region 101, the active region 102, and/or the active region 103 may be physically the same continuous touch-sensitive surface and only functionally divided. Thus, although the physical appearance would be one single touch-sensitive surface, different portions of the single surface may respond differently. For instance, the middle portion of the surface may act like the scrolling region 101 and the two end portions may act like the active regions 102, 103. In the case where the scrolling device 100 is functionally subdivided into regions, the function(s) assigned to one or more of each region may change dynamically depending on the location, timing, direction, and/or other properties of the user's gesture. For instance, a particular gesture such as double-tapping may cause a particular region to switch from a first associated function to a second associated function.

The active regions 102, 103 are preferably disposed at opposing ends or end portions of the scrolling region 101, especially where the scrolling region 101 is elongated such as in the form of a strip. However, the active regions 102, 103 may be disposed anywhere proximate to the scrolling region 101. If no active regions 102, 103 exist, then the entire scrolling device 100 may be the scrolling region 101. The length of the exemplary scrolling region 101 discussed herein has a length D along the longitudinal axis, which may be of any length such as about one inch, between about one inch and about four inches, or greater than about four inches. Preferably, the scrolling region 101 is of a length such that a user could easily move his or her finger from one end of the main scrolling region 101 to the other without having to significantly move his or her hand.

The scrolling device 100 may be of any desired shape and/or size. For example, the scrolling device 100 may be in the shape of a strip, square, rectangle, triangle, wedge, circle, oval, cross, "X", or any other desired shape. For one-dimensional scrolling, an elongated scrolling device 100 and/or scrolling region 101 is preferable but not required. Where the scrolling region 101 is elongated, the scrolling region may be at least twice as long D as it is wide, or at least four times as long D as it is wide, or even more elongated. For two-dimensional scrolling, other shapes may be preferable as will be discussed later. Moreover, the surface of the scrolling device 100 may be flat, curved, and/or angular.

The scrolling device 100 may be separate device or may be incorporated into another device such as a keyboard, mouse, and/or laptop computer. In some embodiments, the scrolling device 100 may be on the side of a keyboard. In other embodiments, the scrolling device 100 may be between some of the keys of the keyboard, especially where the keyboard is a split keyboard. Examples of such embodiments are disclosed in co-pending patent application Ser. No. 09/940,990, entitled "Touch Sensitive Device for Scrolling a Document on a Display," filed Aug. 29, 2001, hereby incorporated by reference as to its entirety, and particularly as to the disclosed exemplary embodiments of touch-sensitive surfaces and devices. Where the scrolling device 100 is incorporated into a keyboard, the user may be more able to scroll a document without having to remove his or her hand from the keyboard.

Referring to FIG. 2, the scrolling device 100 may be coupled to a computer 203 such as a personal computer (e.g., a desktop or laptop computer). The scrolling device 100 and computer 203 together form a system 200. One or more interfaces and/or driving circuitry/software 202, 204 may be utilized to provide communication between the scrolling device 100 and the computer 203. In the example shown in FIG. 2, each of the scrolling device 100 and the computer 203 has its own interface and driver 202, 204. However, some or all of the interfaces and drivers, if any, may be located wherever is convenient, such as all within the scrolling device 100, all within the computer 203, or distributed between the two.

The computer 203 may be a desktop computer, laptop computer, mainframe computer, internal or external server, household appliance, automobile computer system, and/or any other device or apparatus that includes an electronic processing system. The computer 203 may include one or more of the following, which may be coupled together, such as via a bus 209: various other input devices 205 such as a keyboard and/or mouse, a processor 206 such as a microprocessor or central processing unit (CPU), storage 207 such as memory, a hard drive, and/or a diskette drive, and/or a display screen 208 and/or other output device for viewing a document. The device for viewing the document may include a CRT screen, and LCD screen, a projector, a heads-up display, a virtual-reality goggle display, and/or any other device suitable for viewing the document.

The term "viewing" or "displaying" a document is used broadly herein and in the claims: this term encompasses not only visual viewing or displaying but also "viewing" or "displaying" the document audibly via, e.g., a voice synthesizer with speaker that speaks words in the document according to the presently-scrolled position of the document, or a computerized Braille-generator that generates Braille words in the document according to the presently-scrolled position of the document, as might be used by a visually-impaired user.

Figure 4:
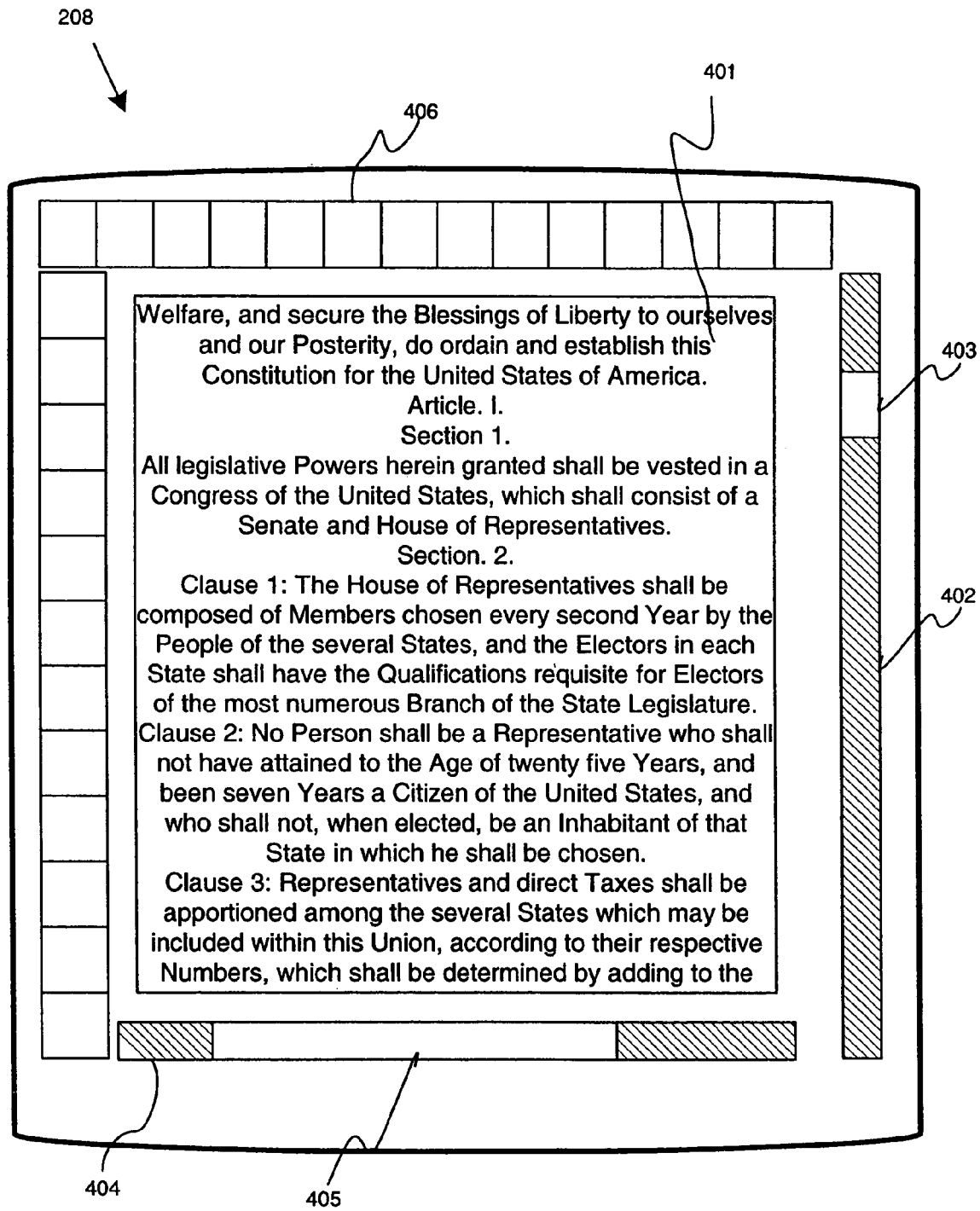
FIG. 4 is an exemplary display on a display screen according to at least one aspect of the present invention.

Referring to FIG. 4, the display screen 208 and/or other output device may display at least one document 401 that the user of the computer 203 may be working on or viewing. The document 401 (which may be stored in the storage 207, controlled by the processor 206, and/or modified by various input devices 205) may be any type of document at all, such as a word processing document, a spreadsheet, a drawing, a photograph or other image, and/or an Internet web page. The document 401 may be the displayed output, results, and/or viewable user interface associated with any software and/or hardware-driven application and/or operating system, such as a control screen, window, or file directory.

A common feature of many documents is that they are often too large to easily view all at once on the display screen 208. Accordingly, it often becomes necessary to scroll through the document 401 on the display screen 208 in order to view various selected portions of the document 401. As shown in FIG. 4, the display screen 208 may also display one or more graphical user interface or indicator (GUI) scrollbars 402, 404 each having GUI "elevators" 403, 405 for controlling and/or indicating the scroll position of the document 401 in the vertical and/or horizontal direction. The display screen may further display various GUI tools 406 for controlling and modifying the document 401, such as font size, underlining, cut, copy, paste, etc. The items 401, 402, 403, 404, 405, 406 on the display screen 208 may be generated and/or controlled by the processor 206 and/or any other component of the system 200, including software and/or an operating system, either alone or in any combination or subcombination. Also, scrolling of the document 401 may be implemented by the processor 206 and/or any other component of the system 200, including software and/or an operating system, either alone or in any combination or subcombination.

Any touching or proximity of the user's finger to the touch-sensitive surface of the scrolling device 100 may cause the scrolling device 100 to generate at least one signal indicating the location, pressure, speed, acceleration, and/or direction of the finger, and/or which portion of the surface(s) of the scrolling device 100 are being touched by the finger. However, for simplicity of description, the remainder of this application assumes that the scrolling device 100 is designed to sense touching, rather than a threshold proximity, of the pointer. These signals may be received by the computer 203 and/or interpreted by the processor 206. Signal generation and processing may, however, occur anywhere within the system 200. For instance, the interfaces and/or drivers 202 and/or 204 may perform some or all of the signal generation and/or processing functions. Thus, in response to the user's finger, one or more signals may be generated by the system 200 indicating information about the contact of the finger to the scrolling device 100, and such signals may be interpreted and processed by the system 200 to provide the various scrolling features described herein.

Although scrolling as a general concept is known and used everyday in personal computers (e.g., by use of a mouse or arrow keys on a keyboard), various new exemplary ways to control scrolling of the document 401 using a scrolling device such as the scrolling device 100 are described herein.

The Active Regions

The active regions (e.g., active region 102) may be configurable in their functions. The active regions may be configured to perform different functions when utilized in combination with one or more keys on a keyboard, and/or buttons on a mouse, of the system 200. For example, tapping the active region 102 without pressing a key on the keyboard may cause the document to page up, while tapping the active region 102 while holding down the Ctrl key (or another key) may cause the document to jump to the document's limits (e.g., its beginning, end, left edge, or right edge). This may occur even where the user is performing another gesture that includes the active region 102. For instance, if the user is holding the finger down on the active region 102, and the Ctrl key is later pushed while the finger is still held down on the active region 102, then the system 200 may immediately recognize this gesture as requesting the document to be paged in the up direction. Such recognition by the system 200 in this case may occur even before the user removes the finger from the active region 102 and/or before the Ctrl key returns to the up position.

The active regions may further be configurable in their sizes and shapes. As previously mentioned, the active regions (e.g., active region 102) may be physically separate from or contiguous with the scrolling region 101. Where the active regions are physically contiguous with the scrolling region 101, the active regions may be defined not physically but functionally by the system 200. For instance, the top (e.g., 10%) and bottom (e.g., 10%) portions of the length of the touch-sensitive surface of the scrolling device 100 may be defined by the system 200 as being the active regions. The size of the portions defining the active regions may be static or they may be dynamically altered in real time by the system 200 and/or upon request by the user. The areas of the active regions may be defined by one or more bounding polygons. This may provide for flexibility in assigning regions that are to act as active regions. For instance, an active region may be defined in a middle portion of the touch-sensitive surface of the scrolling device 100 instead of, or in addition to, an end portion. The active regions may be defined as squares, circles, ovals, rectangles, or any other shape.

Also, the active regions 102, 103 may be used, in one exemplary embodiment, as auto-scroll regions. Auto-scrolling is characterized in that the document 401 may scroll even though the user's finger does not move along the touch-sensitive surface of the scrolling device 100. This does not mean that the user could not move his or her finger and that such movement would not also affect scrolling. But certain gestures that do not require movement of the finger across the touch-sensitive surface, such as tapping, holding, and/or applying pressure, may nevertheless cause the document 401 to scroll.

For example, responsive to the user initiating finger contact with one of the active regions 102, 103, the system 200 may determine which of the active regions are contacted and cause the document 401 to automatically scroll in different directions, such as up or down (and/or left or right), depending upon which active region is contacted. For instance, where the active region 102 is contacted, the document 401 may in response scroll up, and where the active region 103 is contacted, the document 401 may in response scroll down. Automatic scrolling may start following a short delay after the finger contact is initiated with one of the active regions 102, 103. However, a delay is not required. Where the auto-scroll regions embodied as portions of the scrolling region 101, auto-scrolling may occur in response to the user's finger remaining substantially still relative to the scrolling region 101, but not if there is movement. This may reduce the possibility that auto-scrolling would be initiated where the user starts a stroke on the scrolling device 100 within the auto-scrolling regions, hence allowing for the auto-scrolling and relative scrolling modes to better share the physical real estate of the scrolling strip. Scrolling may continue until, for example, the user lifts the finger off the active region or other portion of the touch-sensitive surface that has been touched. Alternatively, the document 401 may continue to scroll even after the finger has been lifted, but may stop scrolling instead responsive to the finger tapping or otherwise touching the touch-sensitive surface again.

Further, where the user slides his or her finger toward an end of the scrolling region 101, if the user continues to hold his or her finger at the end (without substantial movement), then following an optional short delay (e.g., approximately 500 ms), the document 401 may continue to scroll in the same direction that it was previously scrolling in response to the finger movement that led to the finger reaching the end of the scrolling region 101.

Speed-Sensitive Acceleration

In one exemplary embodiment, an acceleration component may be applied to the amount of scrolling depending upon how fast the user moves his or her finger along length D. For the following equations, it will be assumed that the scrolled position of a document 401 on the display screen 208 is expressed as y. The amount that the document 401 is scrolled is expressed as dy, which may be in units of pixels, text lines, millimeters, centimeters, inches, or any other measurement unit. The position of the finger on the touch-sensitive surface of the scrolling device 100 may be continuous or sampled. Where the position is sampled, the sampled position of the finger for sample number i is expressed in the equations as $Y_i$. The amount of scrolling dy may be calculated as an exponential transformation of $(Y_i-Y_{i-1})$, the distance between current and previous finger position samples on the scrolling strip 100. The document may then be scrolled by the amount dy corresponding to the current sample. Such scrolling may thereafter be repeated for each new sample. Thus, the speed of scrolling of the document 401 on the display 208 would be non-proportional to the speed of the finger moving along the scrolling region 101 along the length D. For instance, the following transformation may be applied:

$$dy = K_1(Y_i-Y_{i-1})(e^{1+K_2(Y_i-Y_{i-1})} - e + 1) \quad (1)$$

This transformation can be beneficial by allowing precise, slow scrolling at low speeds ("micro-scrolling"), and rapid scrolling across longer distances when moving quickly ("macro-scrolling"). Thus, this transformation enhances the performance of both micro-scrolling and macro-scrolling. The units of dy are determined by the units of $K_1$. Thus, where $K_1$ is in units of pixels, then the value dy indicates the amount of pixels for the document 401 to scroll on the display screen 208. Where $K_1$ is in centimeters, the value dy indicates the number of centimeters for the document to scroll. Where $K_1$ is in text lines, the value dy indicates the number of text lines for the document to scroll. The value dy may be multiplied by a gain factor depending upon such things as user-selected preferences, the particular software application being used to manipulate/edit the document 401, the zoom factor of the document 401, and/or the type of the document 401 (e.g., word processing, web page, drawing, etc.).

Preferably, a scrolling speed threshold is not used. A continuous variable gain may be applied depending upon how quickly the user's finger is moving across the scrolling region 101 of the scrolling device 100' In a preferred embodiment, $Y_i$ and $Y_{i-1}$ are measured as fractional distances per sample of the length of the scrolling region 101. For instance, $(Y_i-Y_{i-1})=0.0$ indicates no movement between sample i and sample i-1; $(Y_i-Y_{i-1})$ 0.1 may indicate movement across 10% of the total length of the scrolling region 101 (or a predetermined portion thereof) between sample i and sample i-1; and $(Y_i-Y_{i-1})=1.0$ may indicate movement across the entire length D of the scrolling region 101 (or the predetermined portion thereof) between sample i and sample i-1. In such an embodiment, it has been found that the following approximate values work well: $K_1=367.879*$(sampling rate in Hz/20 Hz) and $K_2=5.7546*$(sampling rate in Hz/20 Hz). In other words, $K_1$ may equal approximately 18.3940 times the sampling rate in Hz, and $K_2$ may equal approximately 0.28773 times the sampling rate in Hz. For example, at a sampling rate at 20 Hz, when the user has moved 1% of the length of the scrolling region 101 during one sample (which would be typical of slow, controlled movement), equation (1) becomes:

$$dy=367.879*0.01*(e^{\wedge}(1+5.7546*0.01)-e+1) \quad (2)$$

$$dy=4.27 \quad (3)$$

As another example, where the sampling rate is 50 Hz, again with movement of 1% of the scrolling region 101 length during a single sample, this would mean that the movement along the scrolling region 101 was faster than in the above example with a 20 Hz sampling rate. Using the same $K_1$ and $K_2$ values, equation (1) becomes:

$$dy=919.698*0.01*(e^{\wedge}(1+14.387*0.01)-e+1) \quad (4)$$

$$dy=13.065 \quad (5)$$

To implement the above scrolling feature, the system 200 may generate one or more signals indicating the measured locations $T_i$ and $T_{i-1}$ (and/or the difference between the locations) on the scrolling region 101, and such signals may be processed by the system 200 to implement the algorithm of equation (1). Each measurement may be a sample in time, and the system 200 may also take sampling rate into account.

Rounding to Whole Lines

The amount of scrolling may be rounded to a whole integer number of lines, pages, paragraphs, and/or other portions of the document 401. Such rounding may be performed in conjunction with any of the scrolling modes available to the system 200. In one exemplary embodiment, at least two different current scrolling positions are computed and/or stored. The first scrolling position, which will be called herein the "actual scroll position," is the position on the screen that the viewed document 401 is scrolled to. The actual scroll position reflects a whole integer number of lines and/or pages of scrolling. The second scrolling position, which will be called herein the "virtual scroll position," keeps track of a higher-resolution scroll position within the document 401. The virtual scroll position preferably is not rounded to a whole integer numbers of lines or pages. For instance, where the virtual scroll position may be a measured distance corresponding to 3.23 lines, the actual scroll position may be rounded down to 3 lines exactly or up to 4 lines exactly. Or, where the virtual scroll position may be a measured distance corresponding to 4.56 pages, the actual scroll position may be rounded up to 5 pages exactly or down to 4 pages exactly.

Thus, the virtual and actual scroll positions do not need to be in the same units as each other; for instance, the virtual scroll position may be in inches and the actual scroll position may be stored as the number of text lines and/or as a distance with a known correlation between distance and number of text lines (e.g., it may be known for a particular document that text lines occur every 0.326 inches). Also, the virtual and actual scroll positions may be measured as absolute positions, such as measured relative to the top or bottom of the document 401, and/or as relative positions, such as measured from the last scroll position.

The term "rounding" as used herein includes actual conventional rounding (e.g., 5.2 is rounded to 5.0 and 5.6 is rounded to 6.0) as well as truncation (e.g., 5.x is truncated to 5.0, regardless of the value of x), and/or any other way of reducing the numerical resolution of the actual scroll position. For instance, where the actual scroll position is 3.67 inches, the virtual scroll position may be "rounded" by reducing the numerical resolution of 3.67 centimeters to any of the following: 3.6 centimeters or 3.7 centimeters (where the desired "rounded" resolution is tenths of a centimeter), or 3 centimeters or 4 centimeters (where the desired "rounded" resolution is centimeters).

Figure 3:
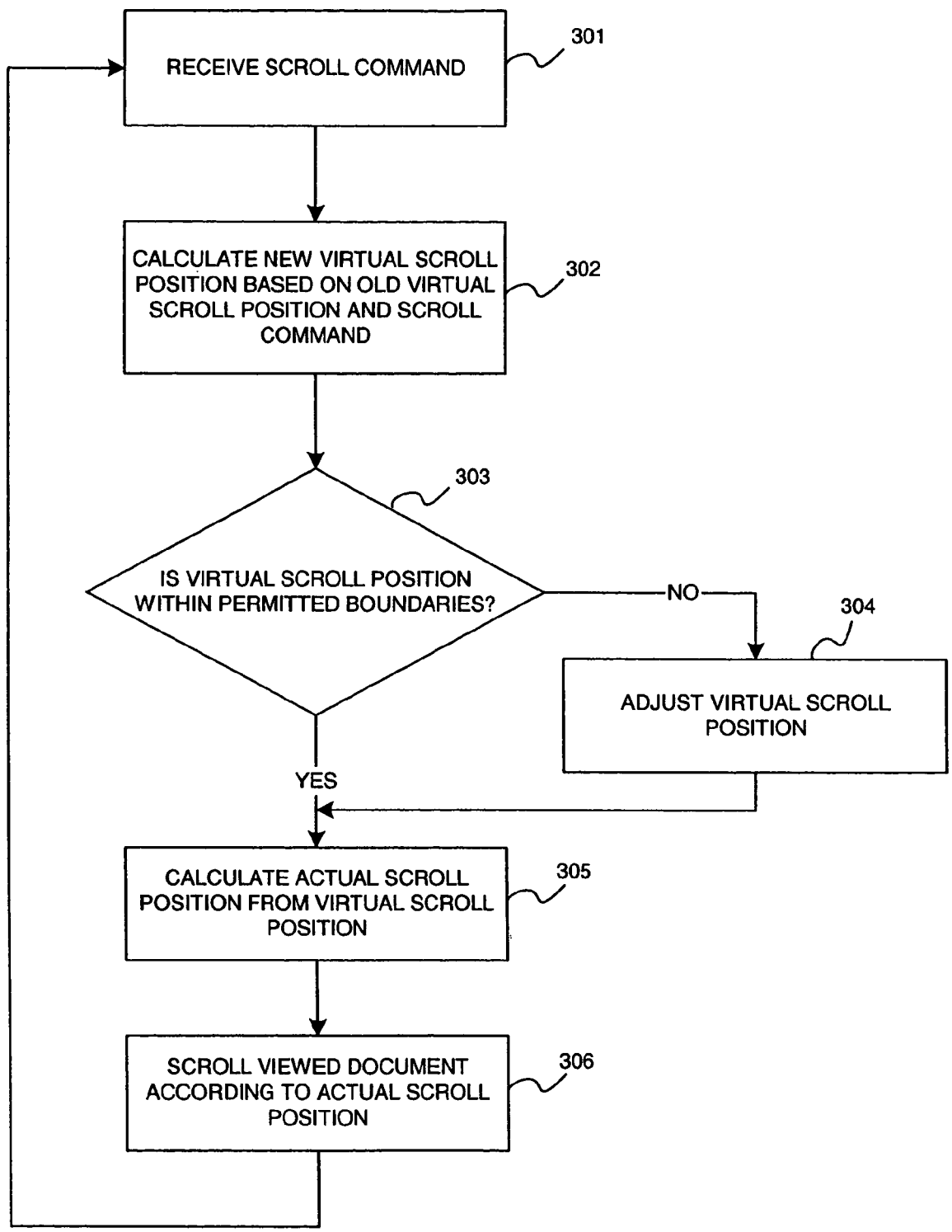
FIG. 3 is a flow diagram showing exemplary steps that may be performed to implement step scrolling according to at least one aspect of the present invention.

An exemplary flow diagram showing how such "rounded" scrolling may be implemented is shown in FIG. 3. The user's gesture is received as an input, thereby generating a scroll command (step 301). A "gesture" may be any touching, sliding, holding or releasing of the finger (or any combination or subcombination thereof) against or from the touch-sensitive surface of the scrolling device 100. For instance, the user may perform a gesture by moving his or her finger down quickly along the surface of the scrolling device 100, such that the scrolling device 100, computer 203, and/or interface(s) 202, 204 attached thereto generates an associated scroll command indicating a downward scroll by a particular amount and/or at a particular speed. The scroll command is converted into a virtual scrolling position, preferably with as much precision as practical (step 302). A prior virtual scrolling position may already be stored (for instance, in the storage 207), in which case a new virtual scrolling position would be calculated by updating the old virtual scrolling position with the scrolling command. For instance, if the old virtual scrolling position is at point A (e.g., 3.72 inches from the top of the document), and the scroll command indicates virtual downward scrolling by a certain amount, then the new calculated virtual scrolling position at point B (e.g., 6.31 inches down from the top of the document 401) be calculated by determining the change (in this example, a downward change of 2.59 inches) in the old virtual scrolling position as a result of applying the scroll command. Of course, virtual and actual scrolling positions may be determine and stored in any format and using any measurement, such as distance, number of lines, number of pages, number of paragraphs, etc.

It is possible that the new virtual scrolling position may be out-of-bounds, such as off the edge of the document or outside of some other defined or arbitrary boundary (e.g., scrolling might be limited to remaining within a particular portion of the document). Thus, a check is preferably made to ensure that the virtual scrolling position is not out-of-bounds (step 303). If it is, then the virtual scrolling position is adjusted to be within the permitted boundary (step 304).

The actual scroll position is computed by converting the units of the virtual scroll position if necessary and rounding the virtual scrolling position to the desired lower resolution such as whole units of document pages or text lines (step 305), and the document 401 as viewed on the display screen 208 may then be scrolled to the actual scrolling position (step 306). In this example, the actual scrolling position may be 6.31 inches rounded to the nearest line, inch (e.g., 6 inches), page, and/or other desired standard. Calculating the actual scrolling position each time based on the updated virtual scrolling position allows subtle changes of the user's input to add up over time (accumulating in the virtual scroll position), which may eventually affect the (more coarse, i.e., lower resolution) actual scrolling position in terms of whole lines or pages of scrolling visible on the screen.

Some or all of the steps described in connection with FIG. 3 may be performed serially or in parallel, may be combined as single steps, may be further subdivided into additional sub-steps, and/or may be combined with other steps from other aspects and embodiments of the present invention such as those described in connection with FIG. 5.

Moving/Not Moving Detection

When scrolling, it may be desirable to ignore very small finger motions in certain circumstances. For instance, it may be desirable to ignore unintentional small movement by the user's finger on the touch-sensitive surface of the scrolling device 100. This is beneficial where, for instance, a user cannot control his or her finger to be absolutely still when holding the finger in one place on the touch-sensitive surface. This may also prevent the document 401 from "swimming," or appearing to move slightly on the display screen, due to small variations in the sensor readings and/or twitching of the user's finger. When the user's finger is in contact with the surface of the scrolling device 100, the system may infer whether or not the user is intentionally moving his or her finger across the surface of the scrolling device 100 by use of a combination of different movement thresholds. The decision as to whether the user is intentionally moving the finger may be used as a building block for several other features and recognized gestures, such as gestures that may freeze scrolling and/or the onset of an auto-scrolling mode in some situations.

Figure 5:
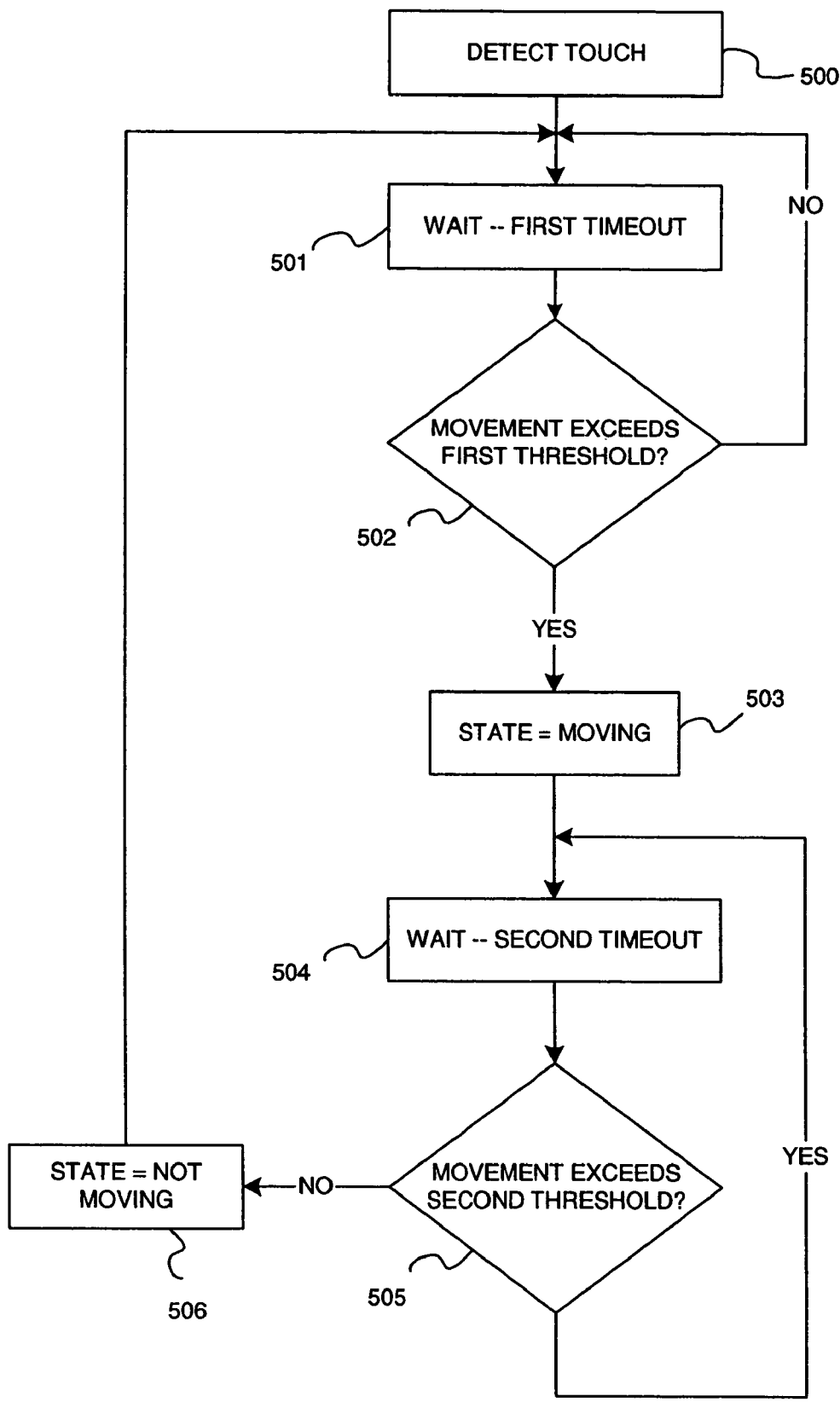
FIG. 5 is a flow diagram showing exemplary steps that may be performed to implement move/no-move detection according to at least one aspect of the present invention.

FIG. 5 shows an exemplary flow diagram of how moving/not moving detection may be implemented. When the user first touches the touch-sensitive surface of the scrolling device 100, as detected in step 500, the user's finger position is considered to be not moving on the scrolling device 100. The state of not moving may be an initial condition. The state of moving or not moving may be stored as a flag or using any other method to effectuate a "moving" or "not moving" state. If it is determined that the finger movement does not exceed a first threshold distance and/or speed within an optional first timeout period (steps 501 and 502), then the finger is still considered to be not moving on the scrolling device 100, and the determination of whether the first threshold is continued. On the other hand, where the finger motion exceeds the first threshold within the first timeout period, the finger is then considered to be moving (the "moving" state), and a flag may be set accordingly (step 503). This flag may be stored, such as in the storage 207. The first threshold, when defined as a distance, may be defined as a set length (e.g., millimeters or inches), set speed (e.g., millimeters per second), set percentage of the scrolling region 101 length D, or any combination or subcombination of these. In one exemplary embodiment, the first threshold may be set at approximately 1% of the length D of the scrolling region 101. The system continues to consider the finger as moving until a second timeout expires (step 504) during which total movement of the finger is less than a second threshold distance and/or speed (step 505).

In exemplary embodiments, the first and second timeouts may be the same or they may be different. For instance, the second timeout may be approximately twice the first timeout (e.g., the first timeout may be be approximately 200 milliseconds and the second timeout may be approximately 400 milliseconds). In still further embodiments, the second threshold may be approximately 0.5% of the length D of the scrolling device 100. Although it is preferable that the second threshold be smaller than the first threshold, the second threshold may be identical to the first threshold or even larger than the first threshold. If the finger movement is less than the second threshold, the finger once again is considered to be not moving (the "not moving" state), and a flag may be set accordingly (step 506). If the finger movement exceeds the second threshold, then the finger is still considered to be moving, and the process continues with another delay being timed at step 504. Some or all of the steps described in connection with FIG. 5 may be performed serially or in parallel, may be combined as single steps, and/or may be further subdivided into additional sub-steps.

In one exemplary embodiment, finger contact with the touch-sensitive surface of the scrolling device 100 does not cause any scrolling until the "moving" state is attained. From then on, motions of the user's finger may cause the document to scroll, until the "not moving" state is attained, at which point scrolling may be locked to its current position until the "moving" state resumes.

Dealing With Lift-Off

Sometimes when the user removes his or her finger from the touch-sensitive surface of the scrolling device 100 (otherwise known herein as "lift-off" or "release"), the user's finger may unintentionally affect or disturb the current scroll position. The effects of this can be reduced by maintaining a FIFO (first-in, first-out) queue of recent finger positions. The FIFO queue may be stored by the system 200, such as in the storage 207 and/or in memory of the scrolling device 100 itself When the user breaks contact with the touch-sensitive surface of the scrolling device 100, the system 200 may search back through the queue to look for a sample where the scrolling motion came to a definite (or near) stop. If such a sample is found, the scroll position may be adjusted to occur at that stop point. Thus, where it appears that the user's intent was to stop, then the scroll position would be adjusted according to the user's apparent intent.

On the other hand, if no such sample is found in the queue that indicates an intended stop, or if the amount (distance) of the correction is larger than a threshold amount (measured by distance and/or percentage of the length scrolling region 101), then the scroll position may be not adjusted. The reason for rejecting a large correction is this indicates that the user probably was moving his or her finger relatively quickly when the user let go of the touch-sensitive surface of the scrolling device 100. This is not an uncommon phenomenon as the resistance or drag of the finger may be expected to be naturally reduced during the lift-off process. Accordingly, not changing the scroll position in such a circumstance would likely be beneficial because the user intends rapid motion, and undoing that motion would counter the user's intent.

Absolute Scrolling

In another exemplary embodiment, an absolute scrolling mode may be invoked, either by default, by decision of the system 200, and/or by user request such as through a particular gesture on the scrolling device 100. The absolute scrolling mode establishes a one-to-one, or proportional, correspondence between the scrolling region 101 (or some portion thereof) and the scrolled position of the document 401 as viewed on the display screen 208 and/or other output device. For example, say that absolute scrolling mode is invoked; if the user's finger is located in the middle of the length of the scrolling region 101 (or the relevant portion thereof), then the document 401 may in response be scrolled to the middle of the document 401. Or, where the user's finger is located 25% from the top of the scrolling region 101 (or the relevant portion thereof), the document 401 may in response be scrolled to the portion of the document 401 that is 25% from the top of the document 401. Thus, the top of the document 401 may correspond to one end of the scrolling region 101 (or the relevant portion thereof) and the bottom of the document 401 may correspond to the other end of the scrolling region 101 (or the relevant portion thereof). Further, absolute scrolling mode may provide access to only a portion of the document 401, such that one end of the scrolling region 101 (or portion thereof) corresponds to a first location in the document 401, and the other end of the scrolling region 101 (or portion thereof) corresponds to a second different location in the document 401, wherein the first and second locations may or may not be the ends of the document 401.

The user may invoke the absolute scrolling mode (or any other mode or function) in one or more of a variety of ways. For instance, absolute scrolling mode may be invoked by a gesture such as tapping-and-holding, double-tapping-and-holding, double-tapping then tapping and holding, or applying more finger pressure than usual for a minimum threshold amount of time, to the scrolling portion 101. Changing scroll modes in response to a gesture on the scrolling device 100 can be beneficial in that the user may not need to move his or her hand from the touch-sensitive surface of the scrolling device 100 in order to invoke a scrolling mode. In one embodiment, such a gesture may be performed anywhere on the touch-sensitive surface of the scrolling device 100, such as at a center portion between the two ends of the touch-sensitive surface. Alternatively, absolute scrolling mode (or any other mode or function) may be invoked by the user pressing a key or button spaced proximate to the touch-sensitive surface of the scrolling device 100 or on a keyboard. When the touch-sensitive surface of the scrolling device 100 is disposed at or near the left side of the keyboard, the Ctrl key (for example) is particularly well suited to activate absolute scrolling as the left-hand thumb can hold the Ctrl key while another finger of the same hand touches the strip. In general, it may be desirable to use a key to activate absolute scrolling (or any other feature or mode of the scrolling device 100) that is reachable simultaneously by the same hand that is touching the touch-sensitive surface of the scrolling device 100. Other exemplary keys that may be used for activating automatic scrolling (or other features or modes of the scrolling device 100) are the Tab or Esc keys (where the touch-sensitive surface of the scrolling device 100 is near the left side of the keyboard), the space bar, the Shift keys, or the Alt keys.

Of course, absolute scrolling mode may be automatically invoked by the system 200 and/or be set as the default scrolling mode. In one exemplary embodiment, the system 200 may compare the gesture with one or more stored gestures to determine whether the gesture is the correct gesture to invoke a mode change. In response to the gesture being correct, the system 200 may change modes, such as into absolute scrolling mode or auto-scroll mode.

At the time that the absolute scrolling mode is invoked, the system 200 may in response (1) scroll, jump, or otherwise move the document 401 to the absolute scrolled position corresponding to the location on which the user's finger invoked absolute scrolling mode on the scrolling device 100, and/or then (2) remain in the absolute scrolling mode for as long as the user maintains contact with touch-sensitive surface of the scrolling device 100. While in the absolute scrolling mode, the document 401 may behave much like it would if the user were to click and drag the elevator(s) 403, 405 of the scrollbar(s) 402, 404 up or down (or left or right). The user may exit the absolute scrolling mode by any desirable technique such as breaking finger contact with the surface of the scrolling strip 100. Alternatively, the user may have to perform an affirmative act such as tapping or double-tapping the scrolling strip 100 to terminate the absolute scrolling mode. After terminating the absolute mode, the system 200 may revert to its "default" mode, which may be some other mode of scrolling.

Auto-Scrolling Based on Finger Position

If the user touches and holds his or her finger anywhere on the scrolling region 101 without moving (such as on a central portion between the two ends of the scrolling region 101), then auto-scrolling mode may also be invoked after an optional short delay. In such an embodiment, subsequent motions of the finger may thereafter cause the document 401 to scroll at a rate depending upon the distance between the initial contact point and the user's current position, and/or depending upon the absolute location of the finger on the scrolling region 101. The rate may be proportional to the distance and/or location, and/or may have a linear or non-linear dependence on the distance and/or location of the finger. Because in certain embodiment the location of the touch determines the rate of auto-scrolling, the user may be able to more accurately control (and dynamically adjust on the fly) the scrolling rate.

In operation, for instance, where the user's finger touches and holds the finger at point A on the scrolling region 101, and then slides the finger across at least some of the length of the scrolling region 101 in a first direction to point B, the document 401 may automatically scroll, and continue to scroll, in a first direction at a rate depending upon the distance between point A and point B. If the user instead had slid the finger to point C on the scrolling region 101, wherein point C is in an opposite direction than point B relative to point A, then the document 401 may automatically scroll, and continue to scroll, in a second opposite direction at a rate depending upon the distance between point A and point C. Of course, the user may continue to slide the finger in order to dynamically adjust the rate of automatic scrolling as desired. Upon the user releasing the finger, the automatic scrolling may cease. As another example, the automatic scrolling rate may depend upon the absolute finger location on the scrolling region 101, such that where the finger is located approximately in the middle of the scrolling region 101, the scrolling rate may be zero, and when the finger is located away from the middle, the automatic scrolling rate may increase with increasing distance from the middle. Any portion of the scrolling region 101 (not just the middle) may be used as a reference from which to measure the absolute position of the finger for purposes of automatic scrolling rate determination.

Auto-Scrolling Rate Determination, Such as Based on Finger Pressure or Contact Area Many different functions for mapping the rate of scrolling to the user's input are possible. For example, the system may use a fixed rate of scrolling and/or a variable rate of scrolling based on various factors such as finger speed, finger pressure/contact area, length of hold, number of taps, and/or frequency of taps. If a fixed rate of scrolling is used, the fixed rate may have a default value, may be user-selectable, and/or may be selectable by the software application that is manipulating/editing the document 401. A variable rate of scrolling may allow the user to continuously adjust the scrolling rate as he or she scans through the document. The capability to continuously adjust the scrolling rate may provide a more controllable and predictable scroll interface.

In one exemplary embodiment, a variable rate of scrolling may be used based upon finger pressure against the touch-sensitive surface of the scrolling device 100. Finger pressure may be measured directly and/or be a function of measured finger contact area upon the touch-sensitive surface of the scrolling device 100. In such an embodiment, an algorithm may be used that normalizes for the amount of finger contact on the current scrolling action and/or performs an exponential transformation of the finger contact area to provide a controllable range of scrolling speeds between slow and fast scrolling. The scrolling rate may be calculated in two steps. For instance, for each sample of finger pressure on the touch-sensitive surface of the scrolling device 100, the following variable P may first be calculated:

$$P = K_3((p/p_0) - 1), \quad (6)$$

where P is the normalized pressure estimate based on contact area, $K_3$ is a gain factor, p is the current pressure reading, and $p_0$ is the pressure chosen for the minimum-rate point described below.

Next, the result of equation (6) may be used to calculate the rate of scrolling for the current sampled finger pressure:

$$dy/dt = K_4(e^{(P+1)} - e + 1) \quad (7)$$

where $K_4$ is a gain factor and dy/dt is the resulting calculated rate of scrolling (t represents time). Thus, using such an equation, the rate of scrolling of the document is a nonlinear function of the finger contact area and/or pressure. If dy/dt is less than zero, then dy/dt may be set to zero. Further, if dy/dt is greater than a threshold, dy/dt may be set to that threshold. When the scrolling rate dy/dt is applied to the scrolling of the document, a positive value of dy/dt may be used for scrolling down (for instance), and to scroll up dy/dt may be multiplied by minus-one.

Figure 8A:
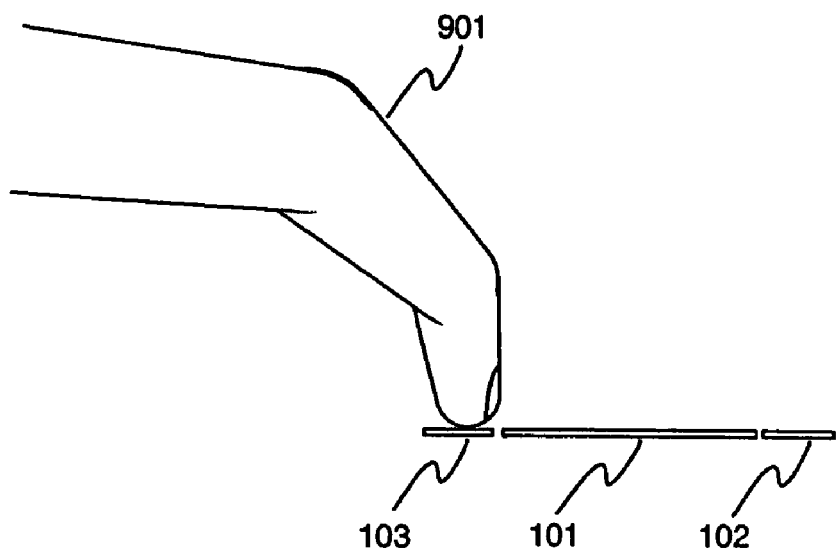
FIGS. 8A and 8B are side views of a user's finger in two different positions relative to the scrolling device of FIG. 11B, according to at least one aspect of the present invention.
Figure 8B:
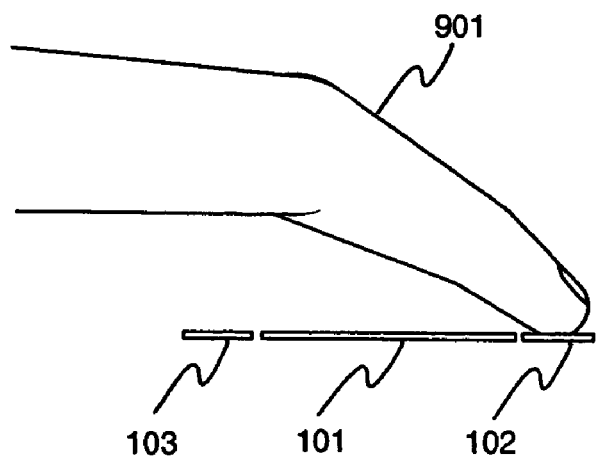

In some exemplary embodiments, the system 200 may determine which of the regions 102, 103 are being touched, and different values of the gain factors $K_3$ and/or $K_4$ may be used for auto-scrolling in opposing directions depending upon which active region 102, 103 is being touched. For instance, the auto-scrolling up and the auto-scrolling down regions (e.g., regions 102 and 103, respectively) may be associated with different gain factors $K_3$ and/or $K_4$. Depending upon the particular shape of the touch-sensitive surface of the scrolling device 100, the shape of any bezel or other divider that may separate the scrolling region 101 from the auto-scrolling regions, and whether auto-scrolling occurs in regions physically separate from the scrolling region 101, different amounts of contact between the user's finger and the auto-scrolling up regions than the auto-scrolling down region may occur. For instance, referring to FIGS. 8A and 8B, the user's finger 801 may, during normal use of the scrolling strip 100, be expected to be at a slightly different angle when contacting the active region 102 than when contacting the active region 103. This causes the amount of surface contact to be greater when the finger is extended (FIG. 8B) than when the finger is curled (FIG. 8A). Accordingly, the values of the gains factors $K_3$ and/or $K_4$ may be set to compensate for this difference such that up auto-scrolling and down auto-scrolling have a similar feel and response as compared to each other. Gain factor $K_4$ is in units of scrolling speed, such as pixels per second, centimeters per second, or text lines per second. The value dy/dt will also have the same units as $K_4$.

The choice of an appropriate value for the $p_0$ minimum-rate point can be important. Several ways of determining the value of $p_0$ are possible, but preferably the dynamics of the current user gesture itself are used to determine a value of $p_0$ in real time as the user is attempting to specify a rate of scrolling. For instance, the finger pressure against the touch-sensitive surface of the scrolling device 100 for the minimum rate point may be sampled following an optional delay after initial contact. The delay should be long enough for the user to establish firm initial contact with the touch-sensitive surface, such as about 200 milliseconds. During this delay, the current value of the finger pressure may be continuously measured and used as a preliminary estimate for $p_0$, so that the user may start scrolling with minimal perceptible delay.

A maximum threshold on the rate of scrolling may alternatively or additionally be imposed. Also, a sliding window may be used that represents the range of anticipated future pressure values p, which may be based on one or more previous pressure values p. Where the computation of dy/dt as shown above results in a rate larger than the maximum threshold, the value for $p_0$ may be recomputed by sliding the window upward in pressure values such that the current pressure value p would result in the maximum threshold rate of scrolling. On the other hand, if the finger pressure falls below the bottom of the window, the value of $p_0$ may be recomputed by sliding the window downward. The known range of pressure values that may be sensed by the scrolling device 100 may be used as a basis for choosing initial default minimum and maximum pressures of the window. The rate limits and/or pressure maximum criteria described below may be used in such a sliding-window strategy. In some embodiments, such a sliding-window technique allows the system 200 to automatically self-calibrate for different users where some have a heavy touch or large fingers as compared to other users who have a light touch or smaller fingers.

Rate limits may be utilized to improve the selection of the $p_0$ minimum-rate point. A maximum and/or minimum rate of movement may be imposed on the above equations such that if a rate limit is exceeded, the $p_0$ minimum-rate point is recalculated to satisfy the limit. This may have the effect of adapting the sensed pressures to the user's gesture and typical reading speeds. Also, because most touch-sensitive pads actually sense finger contact area in order to determine finger pressure, there is often a practical limit on how much "pressure" can be applied. Knowledge of typical such maximum pressure values can be used to help choose the $p_0$ minimum-rate point. For example, if the user starts by pressing hard against the touch-sensitive surface of the scrolling device 100, then the document 401 may immediately scroll quickly where the system 200 knows that the user will not be able to further increase the contact area.

In some embodiments, the pressure maximum or the parameters in the above equations may differ for the active regions 102, 103, since the typical contact area of the user's finger with different regions in different locations may be expected to vary. In other words, the scroll rates in different directions may be different per unit of finger pressure applied to the touch-sensitive surface of the scrolling device 100. Adjustments to the parameters depending upon the area touched on the touch-sensitive surface of the scrolling device 100 may make the pressure response appear more consistent.

Speculative Autoscroll

In an exemplary embodiment, one or more of the active regions (e.g., active region 102) are physically contiguous with the scrolling region 101, or the divisions between the active regions and the scrolling region 101 are small. In such an embodiment, the active regions may have a plurality of functions depending upon how they are used. For example, the active region 102 may be flexibly used both as auto-scrolling regions, as portions of the main scrolling region 101, and as a page up, down, left, or right region. Providing the active region 102 with a flexible plural functionality can be useful where the active region 102 is not physically separate from the scrolling region 101. Otherwise, for example, accidental activation of autoscrolling may frequently occur when the user's finger reaches an end of the scrolling region 101.

Figure 9:
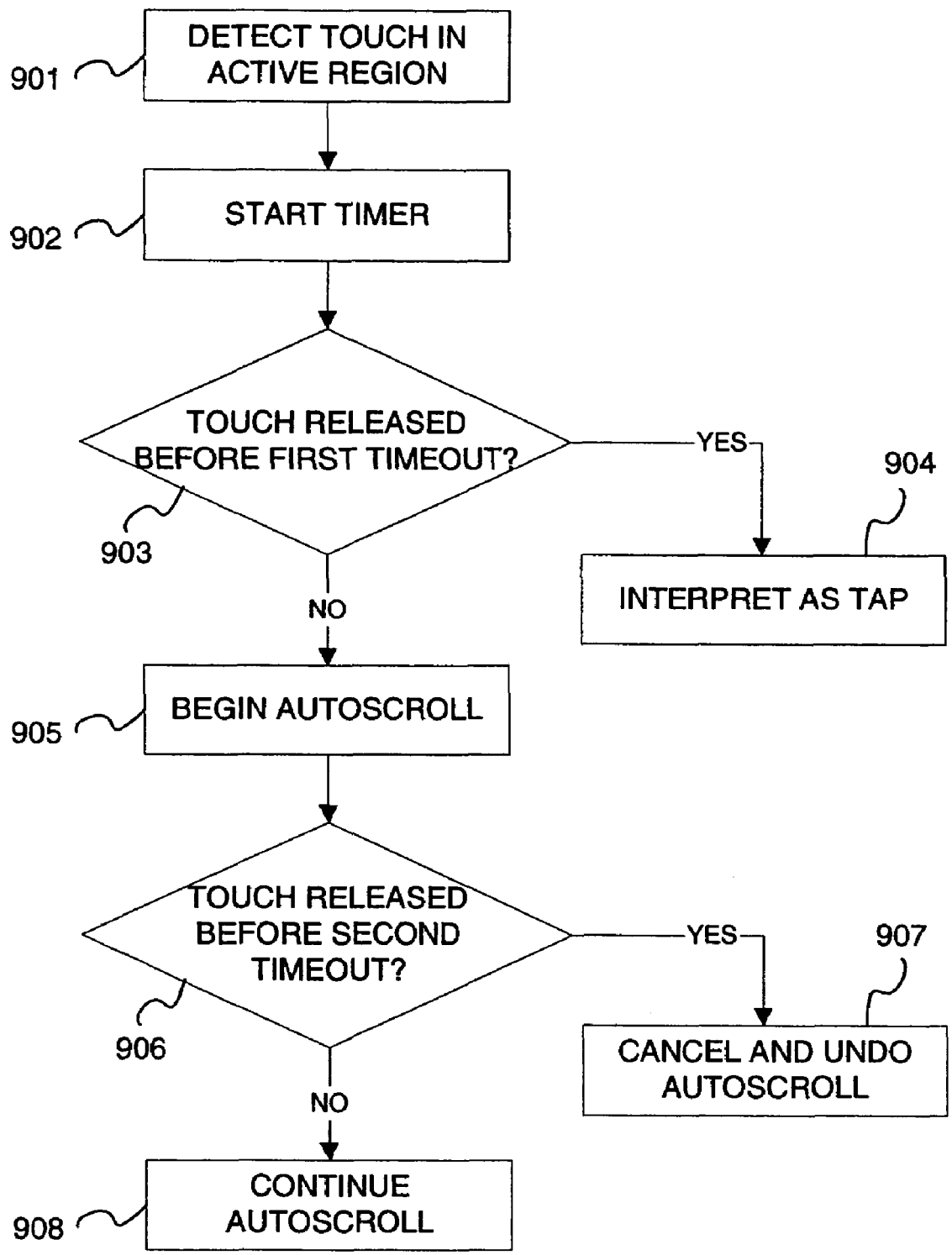
FIG. 9 is a flow diagram showing exemplary steps that may be performed to implement speculative autoscroll according to at least one aspect of the present invention.

It may thus be desirable to provide different ways to activate the various functions of the active regions. For example, a user may be required to tap and then hold the finger down on an active region 102 for a minimum amount of time in order to activate autoscrolling. But if the user were instead to slide the finger along the scrolling region 101 into the active region 102, or slide the finger from the active region 102 into the scrolling region 101, then other scrolling (e.g., absolute scrolling) may be performed as already discussed herein. An example of such an embodiment is illustrated in FIG. 9. The system 200 may detect that the user's finger has touched the active region 102 (step 901). In response, the system 200 may start a timer to measure the amount of time that the user's finger is touching the active region 102 (step 902). At a first timeout (e.g., 200 milliseconds), the system 200 may determine whether the active region 102 is still being continuously touched (step 903). If not, then the touch was relatively short and is interpreted as a tap (step 904). In such a case, autoscrolling would not be activated since the user did not intend autoscrolling. The tap may be interpreted as a particular function, such as a page up/down/left/right button. Thus, by tapping the active region 102, the document 401 may experience a page-up. Also, if the touch in the active region 102 was shorter than the first timeout, but instead of removing the finger, the finger slid to another region such as the scrolling region 101, then the system 200 may not recognize the tap command. This may be true even where the finger re-enters (by sliding) into the active region 102.

On the other hand, if the finger is still continuously touching the active region 102 at the expiration of the first timeout, then the system 200 may speculate that the user will continue to hold. The system 200 may thus immediately (or after a delay such as approximately an additional 200 milliseconds) begin autoscrolling the document (step 905). By speculating in this way, the system 200 is able to provide a quick response the user's gesture; the response of the system 200 may appear nearly instantaneous to the user.

The system 200 may continue to autoscroll while waiting until the expiration of a second longer timeout (e.g., approximately 700 milliseconds). The system may determine whether the finger has still continuously touching the active region 102 at the expiration of the second timeout (step 906).

If the finger is still continuously touching the active region 102 at the expiration of the second timeout, then the system 200 guessed correctly and may continue to autoscroll the document 401 until the finger is released from the active region 102. On the other hand, if the finger is not still touching the active region 102, then the system 200 guessed incorrectly. But no harm has been done. The system 200 may correct the incorrect guess by undoing the amount of autoscrolling that has occurred (e.g., the amount of scrolling that accumulated between the first and second timeouts) (step 907). They system 200 may further perform the correct requested function that would have been performed by tapping the active region 102. In this example, the system 200 would undo the autoscrolling that already occurred and then page the document 401. Alternatively, the system 200 may save time by scrolling the document by a single amount to account for the incorrect autoscrolling and for the intended paging (e.g., by scrolling by the difference in the paging amount and the unintended autoscrolling amount). The effect would be the same: to position the document 401 where the user intended it to be positioned.

Once autoscrolling has begun, if the user's finger slides out of the active region 102 and into the scrolling region 101, then scrolling per the scrolling region 101 (e.g., absolute or relative scrolling) may be activated. If the finger then slide back into the active region 102, autoscrolling may again be activated. A reason for this is that the user may unintentionally move the finger away from the active region 102 while varying finger pressure (i.e., finger contact area) during the autoscrolling gesture.

The timeouts used for speculative autoscroll are exemplary, and other values may be used. For example, the first timeout may be user-definable, and/or may be between 0 milliseconds and the second timeout, inclusive. Also, speculative autoscroll may be utilized with any configuration of scrolling device 100, and not just one that has physically contiguous autoscroll regions.

Horizontal/Diagonal Scrolling and Panning

Figure 6:
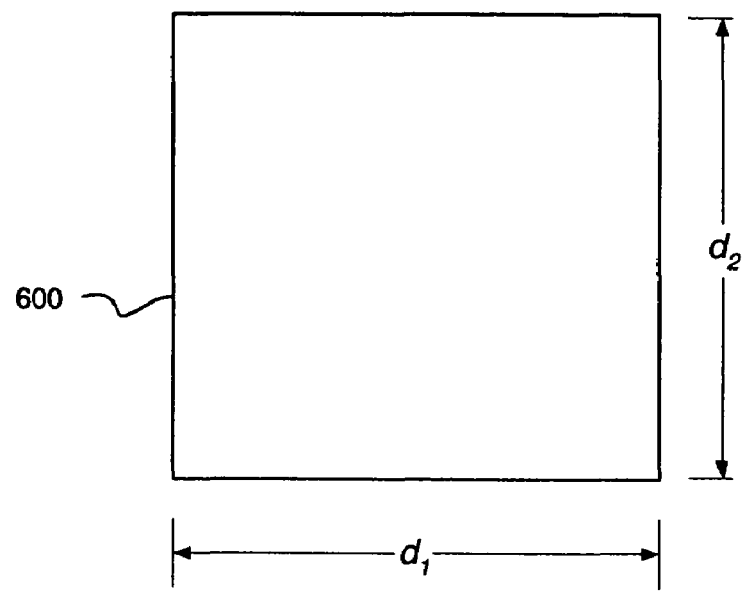
FIG. 6 is a plan view of an exemplary two-dimensional scrolling pad according to at least one aspect of the present invention.
Figure 7:
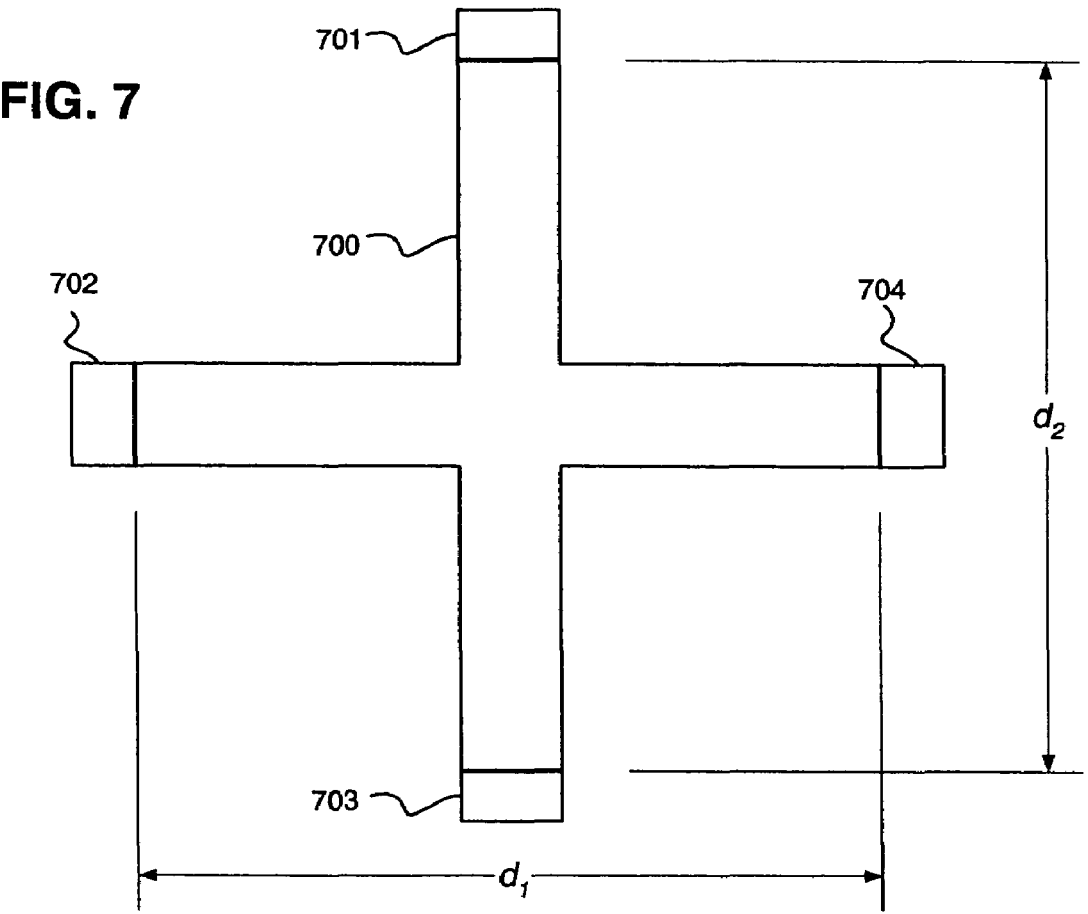
FIG. 7 is a plan view of an exemplary two-dimensional multi-legged scrolling pad according to at least one aspect of the present invention.

Although many of the exemplary embodiments have been described herein primarily in relation to a single axis scrolling strip-shaped scrolling device 100 for vertical scrolling of the document 401, the same aspects and concepts of the invention may be applied to a horizontal scrolling strip, a two-dimensional "scrolling pad" (which provides both vertical and horizontal scrolling, and may further combine the two to provide diagonal scrolling/panning) such as shown in FIG. 6, and/or a multi-leg scrolling surface that may be, e.g., in the shape of a plus or cross as shown in FIG. 7 for providing two-dimensional scrolling along a respective leg. As such, the term "scrolling" as has been used herein includes both one-dimensional scrolling as well as two-dimensional scrolling and panning.

On a two-dimensional scrolling pad, mapping of scrolling motion may give more or less priority to motions that are along a primary axis depending upon user-selectable options and/or the currently running software application that is manipulating/editing the document 401. In some embodiments, such as where scrolling text documents having a width equal to or less than the width of the display screen 208, only the primary axis of motion is considered (thus diagonal movement is prohibited). In other embodiments, such as where scrolling spreadsheet documents, a small dead-band is provided for small motions which discourages small diagonal motions. In still other embodiments, such as where scrolling images, motion in any and all directions (including diagonal motion) is allowed without restriction. Two-dimensional scrolling devices, such as the one illustrated in FIG. 7, may have one or more scrolling regions 700 and/or active regions 701, 702, 707, 703, functioning in the same way as the scrolling region 101 and active regions 102, 103 described above. Also, two-dimensional scrolling devices such as those illustrated in FIGS. 6 and 7 may have lengths $d_1$ and $d_2$, which may be treated as the length D (described earlier for the scrolling device 100) for each respective dimension.

In some embodiments, full or limited horizontal scrolling features are provided by the scrolling device 100. For instance, the scrolling device may have a combination horizontal and vertical scrolling strip (such as in FIG. 7), or a vertical scrolling strip with separate active regions (e.g., for automatic up, down, left, and right scrolling, respectively). The left-scroll and right-scroll active regions (e.g., active regions 702 and 704, respectively) may be similar in operation to the up-scroll and down-scroll active regions (e.g., active regions 701 and 703, respectively) and/or may support similar options such as tapping to page the document 401 left or right, or pressing and holding to auto-scroll the document 401 left or right.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

Also, the same touch-sensitive surface of the scrolling device 100 may be used to support any combination or subcombination of the various different scrolling modes and features described herein. Thus, more than one type of scrolling mode and/or feature may be used with the same scrolling device 100 surface.

Further, although certain exemplary gestures (e.g., tap-and-hold, or double-tap) have been described as ways of implementing or invoking certain features and scrolling modes, any desired gesture may be used to implement or invoke any feature and/or scrolling mode in any combination or subcombination. Any known method of gesture detection may be used in conjunction with the various features and scrolling modes used with the scrolling device 100.

What is claimed is:

1. A method for changing a scroll mode in a computer system for scrolling a document, the method comprising the steps of:
   placing the computer in a manual scrolling mode;
   while in the manual scrolling mode, sensing a gesture at a first location made by a pointer on a touch-sensitive surface, wherein the touch-sensitive surface further includes first and second end portions and a scrolling region disposed between the first and second end portions, and wherein the gesture is made on the scrolling region;
   determining whether the gesture is a touch-and-hold gesture such that the pointer remains substantially still relative to the touch-sensitive surface;
   responsive to the gesture being the touch-and-hold gesture, placing the computer in an auto-scrolling mode; and
   receiving, in the auto-scrolling mode, a subsequent sliding of the pointer on the touch-sensitive surface from the first location to a second location without removal of the pointer prior to the subsequent sliding, and in response causing automatic scrolling of the document, wherein the automatic scrolling is performed at a rate that depends upon a difference between the first and second locations.

2. The method of claim 1, wherein the automatic scrolling mode terminates in response to the pointer being removed from the touch-sensitive surface.

3. The method of claim 1, wherein the step of determining includes comparing the gesture with a stored set of a plurality of gestures including the—touch-and-hold gesture.

4. The method of claim 1, further including a step of reverting to a default scrolling mode in response to another gesture made on the touch-sensitive surface.

5. A computer-readable medium storing computer-executable instructions for performing the steps recited in claim 1.

6. A method in a computer system, comprising:
   changing from a first scroll mode to an auto-scrolling mode in response to a touch-and-hold gesture made relative to a touch-sensitive surface at a first location such that the pointer remains substantially still relative to the touch-sensitive surface, wherein the touch-sensitive surface comprises a continuous surface configured to distinguish between various locations of the pointer relative to the continuous surface; and
   in the auto-scrolling mode, producing automatic scrolling of a document in response to a subsequent sliding of the pointer to a second location on the touch-sensitive surface from the first location without removal of the pointer prior to the subsequent sliding, wherein the automatic scrolling is performed at a rate that depends upon a difference between the first and second locations.

7. The method of claim 6, further including a step of determining whether a received gesture corresponds to a touch-and-hold gesture out of a stored plurality of possible gestures.

8. The method of claim 6, further including a step of reverting the scroll mode in response to a third gesture made relative to the touch-sensitive surface.

9. The method of claim 8, wherein the step of reverting the scroll mode includes switching to an absolute scroll mode.

10. A computer-readable medium storing computer-executable instructions for performing the steps recited in claim 6.

11. A computer-readable medium storing computer-executable instructions for performing steps comprising:
    while in a manual scrolling mode, sensing a gesture at a first location made by a pointer on a touch-sensitive surface;
    determining whether the gesture is a touch-and-hold gesture such that the pointer remains substantially still relative to the touch-sensitive surface;
    responsive to the gesture being the touch-and-hold gesture, switching from the manual scrolling mode to an auto-scrolling mode; and
    producing, in the auto-scrolling mode, automatic scrolling of a document in response to a subsequent sliding of the pointer to a second location on the touch-sensitive surface from the first location without removal of the pointer prior to the subsequent sliding, wherein the automatic scrolling is performed at a rate that depends upon a difference between the first and second locations.

* * * * *